United States Patent
Liu et al.

(10) Patent No.: US 6,895,360 B2
(45) Date of Patent: May 17, 2005

(54) METHOD TO MEASURE OXIDE THICKNESS BY FTIR TO IMPROVE AN IN-LINE CMP ENDPOINT DETERMINATION

(75) Inventors: Ai-Sen Liu, Hsinchu (TW); Syun-Ming Jang, Hsin-Chu (TW)

(73) Assignee: Taiwan Semiconductor Manufacturing Co., Ltd., Hsin Chu (TW)

(*) Notice: Subject to any disclaimer, the term of this patent is extended or adjusted under 35 U.S.C. 154(b) by 0 days.

(21) Appl. No.: 10/322,198

(22) Filed: Dec. 17, 2002

(65) Prior Publication Data

US 2004/0117146 A1 Jun. 17, 2004

(51) Int. Cl.⁷ .................... G01B 11/02; G01B 13/02
(52) U.S. Cl. .................................................. 702/172
(58) Field of Search ................ 702/155, 170, 702/172; 250/370.01, 492.1; 356/630; 438/14

(56) References Cited

U.S. PATENT DOCUMENTS

| | | | | |
|---|---|---|---|---|
| 5,595,916 A | * | 1/1997 | Fujimura et al. | 438/16 |
| 5,962,079 A | * | 10/1999 | Koberstein et al. | 427/508 |
| 6,207,844 B1 | * | 3/2001 | Kouvetakis et al. | 556/1 |
| 6,256,100 B1 | * | 7/2001 | Banet et al. | 356/432 |
| 6,326,318 B1 | * | 12/2001 | Watanabe et al. | 438/780 |
| 6,479,405 B2 | * | 11/2002 | Lee et al. | 438/782 |
| 6,521,930 B2 | * | 2/2003 | Ono | 257/295 |
| 6,633,831 B2 | * | 10/2003 | Nikoonahad et al. | 702/155 |
| 2002/0180991 A1 | * | 12/2002 | Takoudis et al. | 256/630 |
| 2003/0071216 A1 | * | 4/2003 | Rabolt et al. | 250/339.02 |
| 2003/0143326 A1 | * | 7/2003 | Bubb et al. | 427/248.1 |
| 2003/0203502 A1 | * | 10/2003 | Zenhausern et al. | 436/164 |
| 2003/0234450 A1 | * | 12/2003 | Grill et al. | 257/759 |

* cited by examiner

Primary Examiner—Demetrius R. Pretlow
(74) Attorney, Agent, or Firm—Tung & Associates

(57) ABSTRACT

A method for determining a material layer thickness transmissive to infrared (IR) energy in a semiconductor wafer manufacturing process including providing at least one semiconductor wafer comprising an IR transmissive layer; passing IR energy through the IR transmissive layer to produce at least one Fourier transform infrared (FTIR) spectrum; and, determining an amount of the IR transmissive layer present according to an amount of IR energy absorbed by a predetermined contributing characteristic vibrational mode portion of the FTIR spectrum.

14 Claims, 2 Drawing Sheets

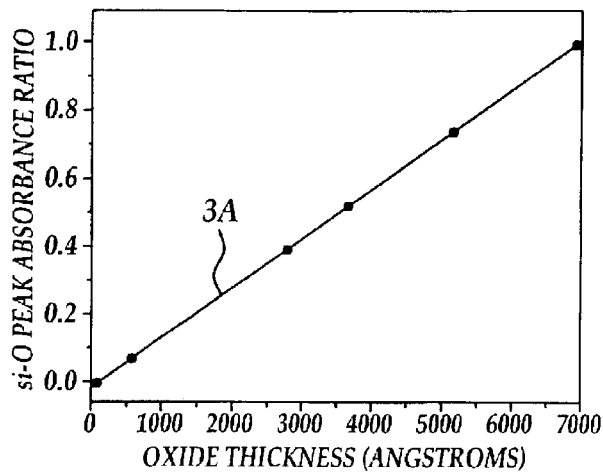
*Figure 3*
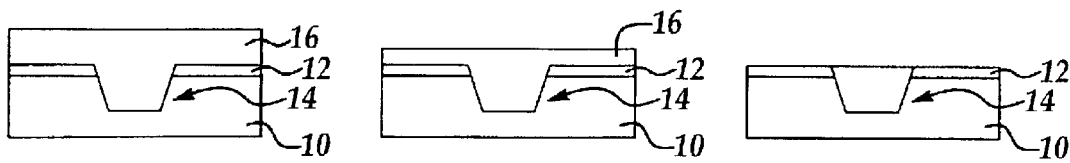
*Figure 4A*  *Figure 4B*  *Figure 4C*
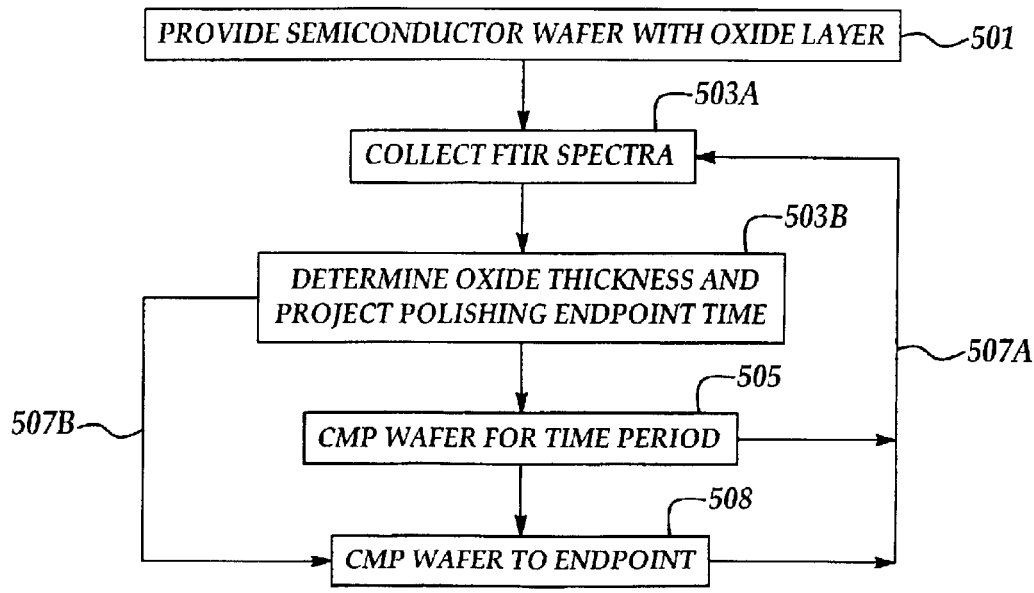
*Figure 5*

METHOD TO MEASURE OXIDE THICKNESS BY FTIR TO IMPROVE AN IN-LINE CMP ENDPOINT DETERMINATION

FIELD OF THE INVENTION

This invention generally relates to metrology methods for measuring film thicknesses and more particularly to a method for measuring a silicon oxide film thickness in a semiconductor wafer microelectronic manufacturing process, for example for use as an in-line metrology tool for endpoint determination in a chemical mechanical polishing CMP process.

BACKGROUND OF THE INVENTION

Planarization is increasingly important in semiconductor manufacturing techniques. As device sizes decrease, the importance of achieving high resolution features through photolithographic processes correspondingly increases thereby placing more severe constraints on the degree of planarity required of a semiconductor wafer processing surface. Excessive degrees of surface non-planarity will undesirably affect the quality of several semiconductor manufacturing process including, for example, photolithographic patterning processes, where the positioning the image plane of the process surface within an increasingly limited depth of focus window is required to achieve high resolution semiconductor feature patterns.

A method of choice for planarizing a semiconductor process wafer following a particular microelectronic circuit fabrication semiconductor wafer manufacturing process such as deposition of a material layer is chemical mechanical polishing (CMP), which can achieve sufficient degrees of both local and global planarization in modern manufacturing processes necessary for successfully carrying out subsequent feature forming processes, for example photolithographic processes which require a high degree of planarization to maintain feature design critical dimensions. The planarity of CMP processes is increasingly critical especially for devices having narrow semiconductor features such as line widths below about 0.25 microns and in the future less than 0.1 micron. CMP planarization is typically used several different times in the manufacture of a multi-level semiconductor device, including planarizing levels of a device containing overlying layers of silicon oxide to achieve local and global planarization for subsequent processing of overlying levels.

During a typical CMP process, the process wafer is mounted on a CMP platen with the process surface face down in contact with a polishing pad onto which polishing slurry is periodically deposited. A down force is applied to the wafer and the wafer process surface is placed in motion with while contacting the polishing pad surface which is also typically placed in motion. The CMP process typically requires polishing slurry that is selective with respect to an underlying material layer to prevent over polishing to include polishing the underlying layer which may detrimentally affect the planarity of the CMP process resulting in erosion and/or dishing. Further, over polishing may result in scratching of surface features where over polishing of the underlying layer is formed of a harder material.

Since slurries are frequently insufficiently selective to prevent such over polishing, CMP processes typically employ an endpoint detection system to determine a point at which the underlying layer is exposed. Endpoint detection systems have been proposed that are both in-situ and in-line. For example, optical systems relying on reflected visible or UV light have been employed in-situ during the polishing process where light is directed at a predetermine angle at the wafer process surface and reflected light is detected and analyzed to determine whether an underlying layer has been exposed. Other in-situ systems have relied on detection of chemicals in the polishing effluent or the change in polishing friction reflected in the amount of electrical current drawn by motors used to move either the polishing platen or the polishing pad surface. In-situ optical detection systems frequently suffer from adequate focusing or inadequate signal intensity to make accurate endpoint detection determinations and are frequently unworkable where no polishing breakthrough from one material layer to another occurs. In-line systems have been developed to overcome theses shortcomings where the process wafer is moved to a nearby wafer thickness measuring station where the wafer process surface is probed to determine whether polishing breakthrough has occurred. For example, such measurements have typically relied on UV or visible light reflectivity or optical interferometry methods.

A shortcoming of endpoint detection systems of the prior art is that the detecting methodology typically relies on the occurrence of a polishing breakthrough with respect to the targeted polishing layer to expose a materially different underlying layer. Frequently, especially in the case of oxide polishing where only a portion of the oxide is polished, no polishing breakthrough occurs, frustrating many of the techniques of the prior art. Further, in cases where a polishing breakthrough occurs thus indicating the exposure of an underlying layer, prior art techniques do not adequately indicate the amount of remaining oxide or allow local probing of the process surface to determine whether substantially the entire overlying oxide layer is removed. As a result, in-line endpoint detection systems of the prior art do not allow updated projections to be made with respect to a projected remaining polishing time or a determination that substantially all of the oxide from the target polishing layer has been removed.

Therefore, there is a need in the semiconductor wafer microelectronic integrated circuit processing art for an improved method for measuring the thickness of an oxide layer for example, including determining the remaining thickness of an oxide layer in a CMP process to improve endpoint detection and to ensure substantially complete removal of the oxide layer.

It is therefore an object of the invention to provide an improved method for measuring the thickness of an oxide layer for example, including determining the remaining thickness of an oxide layer in a CMP process to improve endpoint detection and to ensure substantially complete removal of the oxide layer while overcoming other shortcomings and deficiencies in the prior art.

SUMMARY OF THE INVENTION

To achieve the foregoing and other objects, and in accordance with the purposes of the present invention, as embodied and broadly described herein, the present invention provides a method for determining a material layer thickness transmissive to infrared (IR) energy in a semiconductor wafer manufacturing process.

In a first embodiment, the method includes A method for determining a material layer thickness transmissive to infrared (IR) energy in a semiconductor wafer manufacturing process including providing at least one semiconductor wafer comprising an IR transmissive layer; passing IR energy through the IR transmissive layer to produce at least one Fourier transform infrared (FTIR) spectrum; and, determining an amount of the IR transmissive layer present according to an amount of IR energy absorbed by a predetermined contributing characteristic vibrational mode portion of the FTIR spectrum.

These and other embodiments, aspects and features of the invention will be better understood from a detailed description of the preferred embodiments of the invention which are further described below in conjunction with the accompanying Figures.

BRIEF DESCRIPTION OF THE DRAWINGS

FIG. 3 is a graphical representation of data showing a calibration relationship between a silicon oxide layer thickness and an absorbance peak area ratio of an exemplary Si—O vibrational mode according to an embodiment of the present invention.

FIGS. 4A–4C are cross sectional side view of an exemplary CMP process according to an embodiment of the invention.

FIG. 5 is a process flow diagram including several embodiments of the present invention.

DETAILED DESCRIPTION OF THE PREFERRED EMBODIMENTS

Although the method of the present invention is explained in exemplary implementation for use in a semiconductor wafer CMP process to monitor a thickness or presence of an oxide layer undergoing a CMP process, it will be appreciated that the method of the present invention may be advantageously used to quickly and easily measure the remaining thickness or presence of an oxide layer in any semiconductor manufacturing process.

In a first embodiment of the present invention a semiconductor wafer process surface having an exposed surface portion is provided. An infrared (IR) source of energy (probe) is directed at the process surface and at least one Fourier Transform Infrared (FT-IR) spectra including a detected signal intensity is collected from at targeted measurement area of the process surface including a predetermined bandwidth of frequencies characteristic of at least one vibrational frequency mode characteristic of material present in the pathway of the IR probe. The at least one FTIR spectra is then deconvoluted to obtain individually contributing frequency bandwidths preferably including individual vibrational frequency modes characteristic of material present in the IR probe pathway. The intensity of the FTIR signal of at least one of the individually contributing frequency bandwidths characteristic of the targeted material is then integrated over the bandwidth to obtain a vibrational mode peak area and compared to a previously determined targeted material vibrational peak area to determine an amount of the targeted material removed and amount remaining on the surface.

Figure 1:
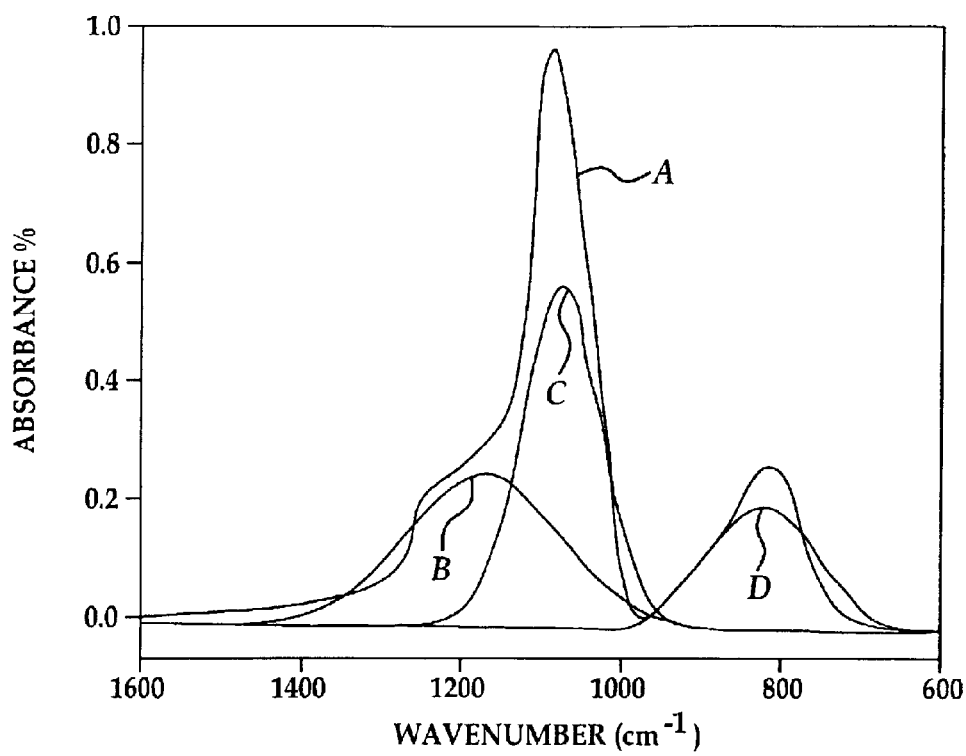
FIG. 1A is a graphical representation of a silicon oxide FTIR spectrum including deconvoluted peaks representing vibrational mode bandwidths contributing to the FTIR spectrum according to an embodiment of the invention.

Referring to FIG. 1, in an exemplary embodiment, the targeted material is preferably silicon oxide, for example silicon dioxide ($SiO_2$) Shown in FIG. 1 is shown an exemplary FTIR spectrum which has been collected over an exemplary bandwidth of frequencies, shown on the horizontal axis, of about 600 to about 1600 reciprocal centimeters ($cm^{-1}$) also known as wavenumbers. It will be appreciated that spectra may be formed by the collection of a plurality of FTIR spectra which are then processed, for example averaged, to produce an FTIR spectrum. It will also be appreciated that FTIR spectra may be collected by detecting a reflected or transmitted signal of IR energy from the targeted material, for example a silicon oxide layer (hereinafter referred to as oxide). For example, reflected spectra may be collected from an oxide layer overlying a surface reflective to the frequency bandwidth desired to be collected in which case signal attenuation or absorbance is proportional to a signal path length greater than the thickness of the oxide layer. Since a silicon wafer is transmissive to an IR signal, for example over the wavelengths 600 to 1600 $cm^{-1}$, it is preferable to collect a transmission spectra, for example directing the incident IR signal about perpendicular to the oxide layer thickness. For example, in a preferred embodiment of the present invention an oxide layer thickness is determined where the oxide layer overlies a silicon nitride layer formed over a silicon semiconductor wafer. It will be appreciated that FTIR measurements modulate the IR energy source during collection of the detected IR signal intensity and process the signal by known methods to produce a swept frequency FTIR spectrum. It will also be appreciated that absorbance or transmittance spectra may be determined from the transmission spectra.

Still referring to FIG. 1, shown on the vertical axis is the absorbance of FTIR spectrum A, determined from the collected signal intensity, for example, transmitted through the oxide layer thickness. Lines B, C, and D represent deconvoluted portions of the absorbance FTIR spectrum deconvoluted to produce individual frequency bandwidths (peaks), for example corresponding to an individual atomic frequency vibrational mode characteristic of silicon dioxide. By the term 'deconvoluted' is meant a process by which an FTIR spectrum is separated into individual contributing characteristic vibrational frequency bandwidths which additively form the FTIR spectrum. By the term 'spectrum' is meant a plurality of values proportional to a measured signal intensity sampled over a bandwidth of frequencies. By the term 'FTIR spectra' is meant spectra produced by collection of at least one FTIR spectrum by an FTIR spectrometer.

Still referring to FIG. 1, for example, the individual frequency bandwidths correspond to characteristic atomic vibrational mode peaks that are shown at B, C, and D. For example peak B represents an Si—O vibrational bending mode centered at about 1175 $cm^{-1}$, while peak C represents an Si—O vibrational stretching mode centered at about 1078 $cm^1$. Peak D on the other hand represents a characteristic vibrational frequency bandwidth centered on about 830 $cm^{-1}$ of a different material, for example an underlying layer of silicon nitride. As will be understood by a practitioner of ordinary skill, there are several known methods for deconvoluting spectra into individual contributing peak (e.g., absorbing) components and may be easily integrated into a computer program to automate the deconvolution process.

Figure 2:
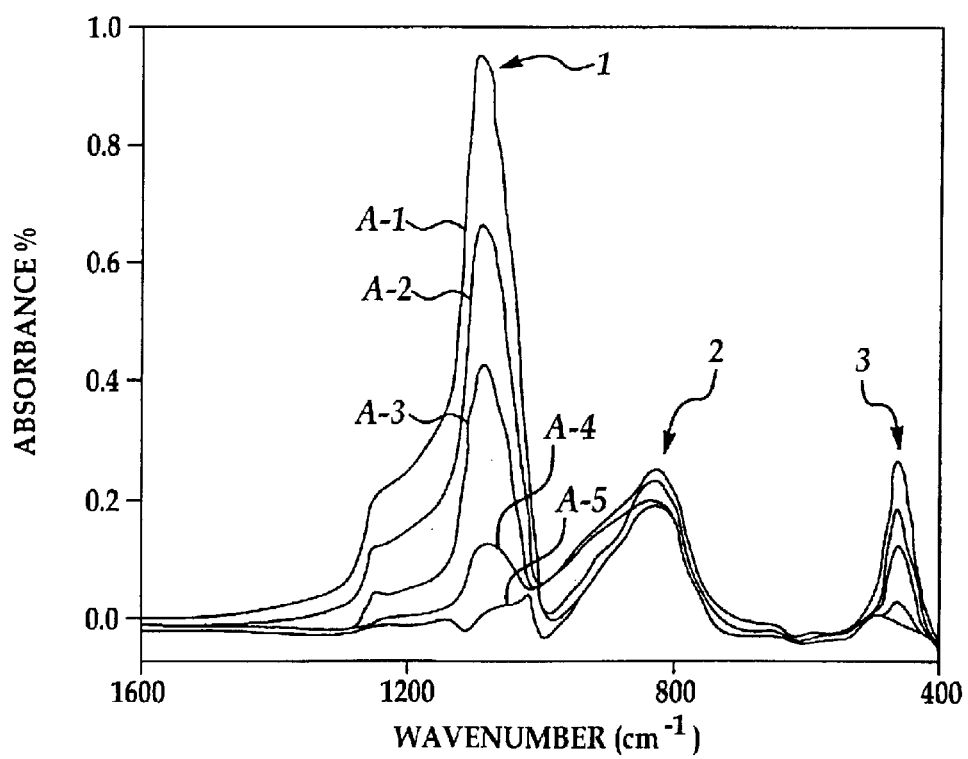
FIG. 2 is a graphical representation of a series of FTIR spectra taken successively following periods of CMP to remove a portion of a silicon oxide layer according to an embodiment of the invention.

Referring to FIG. 2, in an exemplary embodiment, are shown a series of FTIR spectra measured from the same targeted measuring area of a silicon oxide layer overlying a silicon nitride layer following successive time periods of a CMP process removing successive portions of the overlying silicon oxide layer. For example lines A-1, A-2, A-3, A-4, and A-5 represent FTIR spectra detected in transmission through the silicon oxide layer and transformed to absorbance spectra following successive CMP time periods. Although the individual vibration mode peaks following a deconvolution process are not shown for clarity, the area of at least one vibrational mode peak area characteristic of an Si—O vibrational mode is determined. For example, peaks 1 and 3 represent one or more Si—O vibrational modes, for example peak 1 representing a convoluted signal of two Si—O vibrational modes. For example peak 1 is deconvoluted into individual vibrational mode peaks to determine a peak area for each of the deconvoluted peaks. Peak 2 represents a vibrational mode peak from an underlying silicon nitride layer and is seen to remain at about the same intensity following each CMP process and may be used as a reference peak area to determine an error margin.

In one embodiment of the present invention, a peak area of an individual vibrational mode peak is determined prior to an oxide layer removal process, for example, a CMP process, to form a reference vibrational mode area from which a reference silicon oxide thickness is determined. Following removal of a portion of the oxide layer a subsequent vibrational mode peak area is determined and a vibrational mode peak area ratio of the subsequent vibrational mode peak area to the initial vibrational mode peak area is determined. The vibrational mode peak area ratio is directly proportional to a remaining portion of the oxide layer thickness thus allowing determination of both the amount of the oxide layer removed and the amount of oxide layer remaining.

Referring to FIG. 3 are absorbance peak area ratio values on the vertical axis of an exemplary Si—O vibrational mode peak obtained according to FTIR spectra deconvolution and peak area integration according to preferred embodiments of the invention. The absorbance peak area ratio values are plotted against a separately determined silicon oxide thickness, shown on the horizontal axis, to obtain a calibration relationship shown as line 3A correlating the absorbance peak area ratio values and the silicon oxide thickness. The silicon oxide thickness is preferably determined by independently determining the oxide layer thickness, for example by viewing a semiconductor process wafer in cross section by scanning electron microscopy to determine the oxide layer thickness following. It is seen that a linear calibration relationship e.g., line 3A exists between the silicon oxide thickness and the Si—O absorbance peak ratio obtained according to preferred embodiments.

In one embodiment of the invention, at least one of the absorbance peak area ratios (vibrational peak mode area ratios) is determined from a selected targeted material, for example silicon oxide, and correlated with an independently determined oxide layer thickness to produce a calibration relationship, for example a mathematical relationship such as a linear relationship allowing the calculation of an oxide layer thickness from an initial oxide layer thickness and an absorbance peak area ratio. Thereafter, the calibration relationship is used to directly determine, for example by interpolation or extrapolation an oxide layer thickness after determination of an absorbance peak area ratio in a subsequent oxide layer removal process, for example a CMP process. For example, an initial absorbance peak area is determined for an initial oxide layer thickness. Thereafter, following a time periods of CMP, subsequent FTIR measurements are made to determine an absorbance peak area and an absorbance peak area ratio. The absorbance peak area ratio is determined with respect to the initial absorbance peak and the calibration relationship then used to determine a present oxide layer thickness including a remove oxide layer thickness and a remaining oxide layer thickness (amount).

For example, in another embodiment, the method of the present invention is implemented as an in-line process in a CMP system. For example, one or more reference semiconductor wafers having a reference oxide layer thickness forming a process surface may be included in a process where a plurality of wafers are polished in parallel. For example, following a first polishing time period, a reference wafer is removed and transported to a nearby FTIR measuring station for collection of an FTIR spectra and determination of a removed oxide layer thickness and a remaining oxide layer thickness. Preferably, the reference wafer is rinsed and dried prior to measurement to eliminate absorptive materials present on the process surface. For example, the CMP process may be suspended during the FTIR measuring process and the reference wafer returned to the CMP polishing process for continued polishing for a second polishing time period followed by at least a second FTIR measurement to determine a remaining oxide layer thickness. Following at least the first FTIR measurement, a polishing rate is determined to project a projected polishing time period to reach a polishing endpoint. The reference wafer is then returned to the CMP polishing process for an additional predetermined polishing time period. A second FTIR measurement may optionally be made to determine a second oxide layer thickness and project a second polishing endpoint time period based on a remaining oxide layer thickness and polishing rate. Following reaching the projected endpoint, for example, where an underlying material layer is present, for example silicon nitride, the reference wafer is optionally subjected to at least a third FTIR measurement to determine an amount of remaining oxide on the wafer surface and to determine an additional desired CMP over polishing time period. The process may be repeated to ensure substantially complete removal of the oxide layer. It will be appreciated that several FTIR measurements may be made over a plurality of predetermined wafer surface areas, for example by orienting the reference wafer in a predetermined way and having a positioning stage to position the reference wafer for FTIR measurements made through thickness portions of the oxide layer at predetermined positions of the wafer process surface.

In another embodiment, a plurality of reference (monitor) wafers are included in the CMP process one of the plurality of reference wafers periodically removed following a CMP polishing period for at least one FTIR measurement to determine an oxide layer thickness and material removal rate. For example, the CMP polishing process may continue after removing a first reference wafer for FTIR measurement for determination of an oxide removal thickness and a remaining oxide layer thickness. A polishing rate may be determined following the first FTIR measurement after beginning the CMP polishing process with reference to an initial FTIR measurement made prior to beginning the CMP process to determine an initial thickness. For example, a removed thickness portion of the oxide layer is determined following an initial CMP polishing period and divided by an initial polishing time to determine a material removal rate. The material removal rate is then used to project a remaining polishing time to remove a remaining desired thickness portion of the oxide layer.

Following a second polishing period a second reference water is removed from the CMP process for FTIR measurement, the first and the second reference wafers having about the same initial oxide layer thickness. Following the second FTIR measurement to determine an oxide layer thickness, an updated material removal rate (polishing rate) is determined to project an updated polishing endpoint time period. The CMP polishing process may either continue during removal and performance FTIR measurement of one of the reference wafers or may be suspended depending on polishing time and FTIR measurement time constraints.

In another embodiment, the FTIR measurement method of the present invention is used in a shallow trench isolation (STI) formation process. For example, in an exemplary STI process, referring to FIG. 4A, is shown a side view portion of a semiconductor wafer substrate 10, for example silicon, having an overlying layer of silicon nitride 12. An STI trench 14 is photolithographically patterned and anisotropically etched through the silicon nitride layer 12 into the silicon wafer substrate 10. A silicon oxide layer 16 is then blanket deposited to backfill the STI trench 14 and form a portion overlying the silicon nitride layer 12. An initial FTIR measurement is then made over at least one predetermined volume portion of the wafer surface according to preferred embodiments to determine an initial absorbance peak area for the silicon oxide layer 16.

Referring to FIG. 4B, a CMP process is then carried out for a predetermined time period to remove a portion of the silicon oxide layer 16. A second FTIR measurement is then made over the same at least one predetermined volume portion of the wafer surface to determine a second absorbance peak area. A absorbance peak area ratio is then determined by dividing the second absorbance peak area by the first absorbance peak area. The absorbance peak area ratio is then used to determine a removed oxide layer portion and a remaining oxide layer thickness. A projected polishing time period to remove the remaining portion of the oxide layer is determined according to the amount of oxide remaining and a polishing rate either previously determined or based on a newly determined polishing rate.

Optionally, at least a third FTIR measurement is made following a second polishing period to determine a second remaining oxide thickness and a second removed oxide layer portion to determine an updated polishing rate and updated projected polishing time period. For example, an updated polishing rate is determined from the polishing time period and removed oxide layer portions. An updated projected polishing time period for removal of the oxide layer is projected to carry out a third polishing time period.

Referring to FIG. 4C, following a third polishing period, the silicon oxide layer 16 is preferably substantially removed. Preferably, a subsequent FTIR measurement is carried out to ensure that the oxide layer 16 is substantially removed. Subsequent CMP over polishing may be carried out including a newly updated projected polishing time period to ensure substantial removal of the silicon oxide layer while minimizing polishing of the silicon nitride layer. For example, the area of a selected deconvoluted absorbance peak characteristic of silicon oxide is preferably about zero. For example, prior to carrying out a wet etching process using hot phosphoric acid to remove the silicon nitride layer, it is preferable that the silicon oxide layer overlying the silicon nitride layer be substantially removed for an improved wet etching process.

Referring to FIG. 5 is a process flow diagram including several embodiments of the invention. In process 501, at least one semiconductor process wafer is provided including an exposed silicon oxide layer having a predetermined thickness. In process 503A, at least one FTIR spectra is collected from the at least one semiconductor process wafer including at least one sampling area. In process 503B, a deconvolution process is carried out on the FTIR spectra to determine a silicon oxide layer thickness and determine a projected polishing time to endpoint. In process 505, the at least one semiconductor process wafer is subjected to a chemical mechanical polish (CMP) process for a predetermined time period. As indicated by process direction arrow 507A, optionally at least a second FTIR spectra is collected and processed according to processes 503A and 503B to determine a silicon oxide layer thickness including updating a projected polishing time to endpoint, prior to polishing for a second predetermined time period in process 505 or polishing to endpoint in process 508 as indicated by process directional arrow 507B. In process 508, the CMP process is carried out to the projected polishing endpoint. As indicated by directional arrow 507C, following polishing to endpoint in process 508, optionally additional FTIR spectra are collected and processed according to processes 503A and 503B to determine whether endpoint has been reached including determining an amount of silicon oxide remaining on the polishing surface and updating the projected polishing time to endpoint, prior to resuming the CMP polishing process in process 508, as indicated by process directional arrow 507B to polishing endpoint.

The preferred embodiments, aspects, and features of the invention having been described, it will be apparent to those skilled in the art that numerous variations, modifications, and substitutions may be made without departing from the spirit of the invention as disclosed and further claimed below.

What is claimed is:

1. A method for determining a material layer thickness transmissive to infrared (IR) energy in a semiconductor wafer manufacturing process comprising the steps of:

providing at least one semiconductor wafer comprising an IR transmissive layer;

passing IR energy through the IR transmissive layer to produce at least one Fourier transform infrared (FTIR) spectrum; and, determining an amount of the IR transmissive layer present according to an amount of IR energy absorbed by a predetermined contributing characteristic vibrational mode portion of the FTIR spectrum, which comprises at least one bandwidth of frequencies characteristic of an atomic bond vibrational mode of the IR transmissive layer, said predetermined contributing characteristic vibration mode portion is determined according to a deconvoluted peak area representing absorbance corresponding to the at least one bandwidth of frequencies.

2. The method of claim 1, wherein the step of determining further comprises correlating the peak area with an independently determined amount of the IR transmissive material to produce a calibration relationship.

3. The method of claim 1, further comprising the step of carrying out a chemical mechanical polish (CMP) process to remove at least a portion of the IR transmissive layer.

4. The method of claim 3, further comprising the step of projecting a polishing endpoint for the CMP process following the step of determining an amount.

5. The method of claim 4, wherein the at least one semiconductor wafer includes a thickness monitor wafer having about the same thickness of the IR transmissive layer.

6. The method of claim 5, wherein the CMP process includes a first polishing time period followed by repeating the steps of passing IR energy, determining an amount and projecting a polishing endpoint.

7. The method of claim 3, wherein the IR transmissive layer comprises a shallow trench isolation (STI) silicon oxide layer overlying a silicon nitride layer.

8. A method for determining a silicon oxide layer thickness for carrying out a chemical mechanical polish (CMP) process in a semiconductor wafer manufacturing process comprising the steps of:

provliding at least one semiconductor wafer comprising an exposed silicon oxide layer;

collecting at least one Fourier transform infrared (FTIR) spectrum by passing IR energy through at least one sampled thickness portion of the silicon oxide layer;

determining the thickness of the silicon oxide layer;

projecting a polishing endpoint of the CMP process;

carrying out the CMP process for a predetermined time period; and repeating the steps of collecting, determining, and projecting following the step of carrying out the CMP process.

9. The method of claim 8, wherein a polishing rate is determined to project the polishing endpoint following at least two steps of determining.

10. The method of claim 8, wherein at least one semiconductor wafer comprises a thickness monitor wafer for carrying out the step of collecting in-line during the CMP process.

11. The method of claim 8, wherein the step of determining comprises determining a peak area of at least one atomic vibrational mode characteristic of the silicon oxide layer contributing to an absorbance of at least one FTIR spectrum.

12. The method of claim 10, wherein the at least one atomic vibrational mode characteristic of the silicon oxide layer includes a peak area having the largest area.

13. The method of claim 8, wherein passing IR energy through at least one sampled thickness portion includes passing the IR energy through a silicon semiconductor wafer.

14. The method of claim 8, wherein the silicon oxide layer comprises a shallow trench isolation (STI) silicon oxide layer overlying a silicon nitride layer.

\* \* \* \* \*